Figure 1:
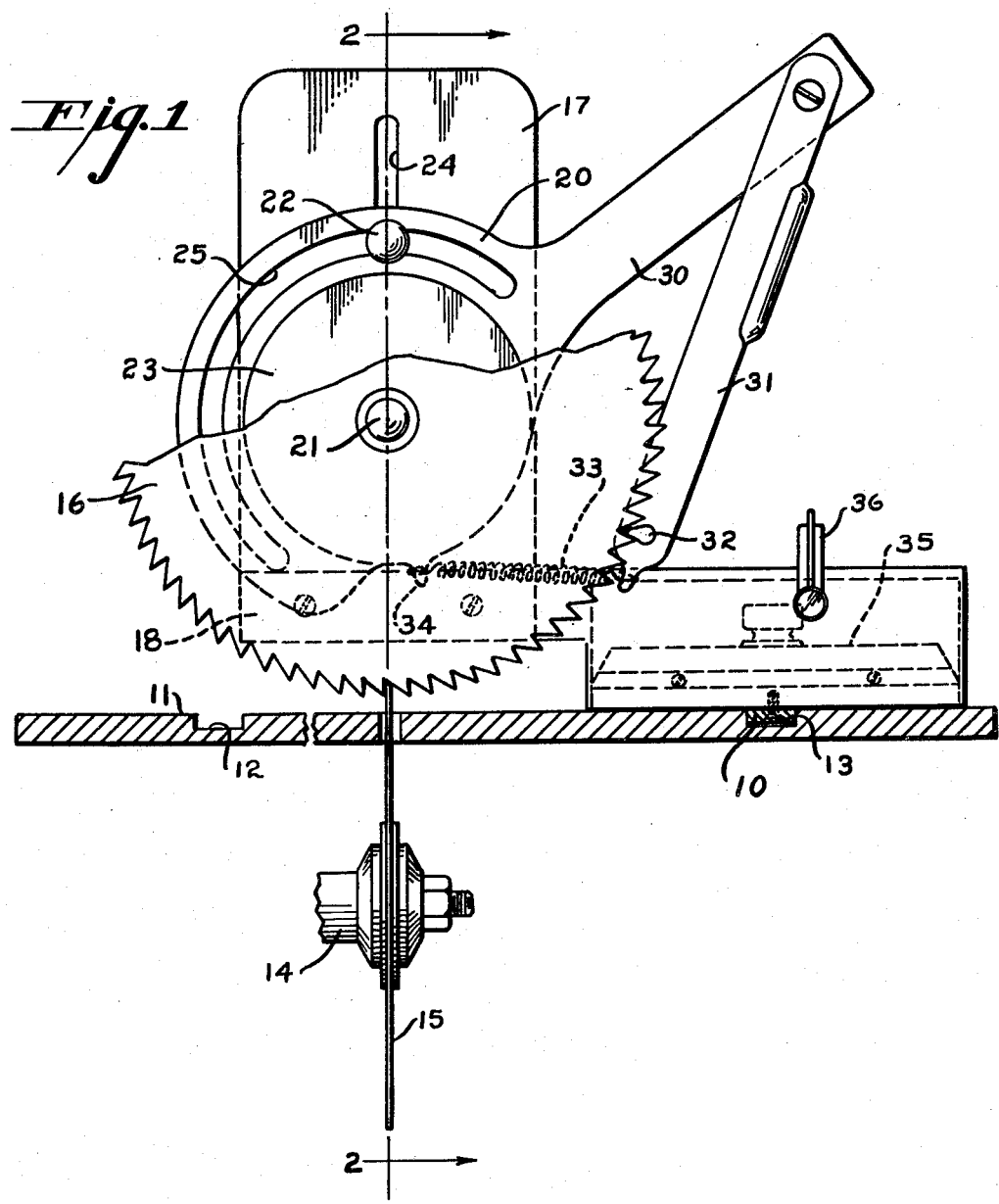

July 28, 1953

C. A. PHILLIPS ET AL 2,646,697

SAW SHARPENER

Filed Aug. 1, 1950

2 Sheets-Sheet 1

INVENTORS
CARLETON A. PHILLIPS
AND WILLIAM B. SANFORD
BY
Vance E Hoffman

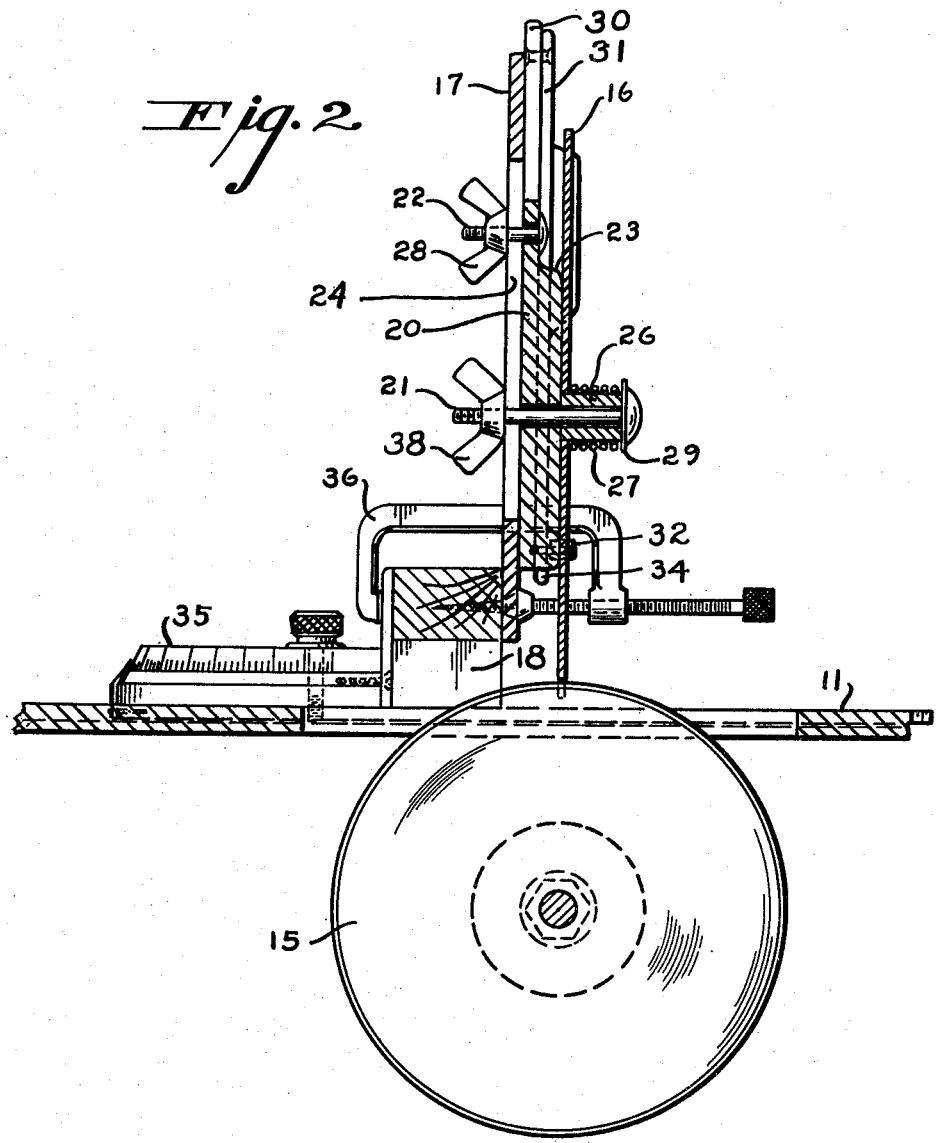

Patented July 28, 1953

2,646,697

UNITED STATES PATENT OFFICE 2,646,697

SAW SHARPENER

Carleton A. Phillips, Corning, and William B. Sanford, Painted Post, N. Y.

Application August 1, 1950, Serial No. 177,017

5 Claims. (Cl. 76—37)

The present invention relates to saw sharpeners and has for its prime object the provision of an extremely simple device which may be readily employed in combination with the chassis of a conventional form of circular power saw to sharpen its circular saw and/or to sharpen similar saws of a substantial range of diameters.

Another object is the provision of a device which has adjustable features enabling the grinding of the faces of the teeth of a circular saw squarely or on a bevel, as desired.

Another object is the provision of a device of the foregoing character wherein a pawl adapted to hold the saw against turning movement about its axis during the sharpening of a tooth thereof is carried by the saw support so that initial rotary and/or vertical adjustment of the saw with respect to the grinding disc does not require any alteration or adjustment of the pawl.

In the accompanying drawing Fig. 1 is a sectional front elevation of a conventional circular saw table showing a fragment of the arbor with the saw thereof replaced by a grinding disc. Shown in full is the usual miter having clamped thereto an assembly embodying the invention with a saw shown partly broken away mounted thereon.

Fig. 2 is a view taken on line 2—2 of Fig. 1.

Referring to the drawings in detail, 11 represents the table of any conventional form of circular power saw, preferably of the tiltable table or tiltable arbor type, having the usual miter guide grooves 12 and 13 for receipt of the slide bar 10 of a miter 35, and having its arbor 14 equipped with a suitable grinding disc 15.

A device for holding a saw such as 16 to be sharpened includes a vertically disposed base plate 17 secured at its bottom end to a transverse wood block 18 cut-away in the area below the bottom edge of the base plate. A saw holder 20 is adjustably secured to plate 17 by means of clamping bolts 21 and 22. Bolt 21 passes through a perforation in the axial center of hub 23 of saw support 20 and through a vertical slot 24 in plate 17. A bushing 26 of an outside diameter to fit the hole of saw 16 is also arranged on bolt 21 and clamped between hub 23 and a washer 29 by means of a wing nut 25. Saw 16 is snugly held against hub 23 by a coil spring 27 threaded over the bushing 26 and held compressed between the saw and washer 29. Bolt 22 passes through slot 24 and through an arcuate slot 25 in saw holder 20 concentric to the periphery of hub 23. Bolt 22, with its cooperative wing nut 28, provides a second means of clamping the plate 17 and saw holder 20 to one another.

Forming an integral part of holder 20 is an arm 30 having hinged to its free end one end of a lever or spacing pawl bar 31. The other end of bar 31 is provided with a pawl 32 adapted to enter the gullet between adjoining teeth of the saw. A helical spring 33 extends between the otherwise free end of bar 31 and pierced lug 34 projecting from the convex face of hub 23, and serves to resiliently maintain the pawl 32 in engagement with the saw, but enables movement of the bar to free the saw for turning movement about bushing 26.

Holder 20, with a saw such as 16 mounted thereon, is vertically adjusted to such position that teeth of the saw project into the space below the bottom edge of base plate 17, after which the wing nuts 25 and 28 are tightened down to lock the holder 20 rigid with respect to plate 17.

What is claimed is:

1. In combination, a vertically disposed plate having an elongated slot therethrough extending a substantial distance down from near the top margin of said plate, a vertically disposed saw support arranged adjacent said plate having a perforation therethrough and also having an arcuate slot therethrough extending about a center passing through said perforation, a bolt passing through said elongated slot and said perforation, a second bolt passing through said slots and adapted to clamp said saw support to said plate in any relative position of the plate and support permitted by said slots, means including said first bolt for clamping said plate and support to one another and for rotatably supporting a circular saw about the axis of said arcuate slot.

2. A work holder including a plate having a longitudinal slot therein, a saw support having an aperture and an arcuate slot therethrough respectively, the aperture center and the center point about which the arcuate slot extends being the same, means passing through said slots for clamping said plate and support in any of a plurality of rotary positions with respect to one another, an element passing through said aperture and said first slot and over which the eye of a circular saw may be passed, a bushing cooperative with said element to center such saw with respect thereto and for assisting said element in rigidly clamping said support to said plate at any of an infinite number of positions along said longitudinal slot, means for resiliently holding the saw against said support, and readily displacable means for locking the saw against turning relative to said support.

3. The combination with a circular saw chassis assembly including a table with a miter groove therein, an adjustable angle miter slidable along such groove and a rotatable saw blade mandrel, of a grinding disc carried on the mandrel, and a support in fixed relation to the miter adapted to hold a circular saw blade thereon with a tooth thereof in a position to be passively engaged by such disc by movement of the miter along its groove said adjustable miter comprising means whereby the angular position of the saw can be attained with respect to that of the disc so that any desired beveling of a saw tooth can be effected by such disc.

4. A work support consisting of an upstanding generally rectangular plate having a longitudinal slot extending therethrough lengthwise of the height thereof, a circular saw support having an aperture therethrough, an extension beyond the periphery of said support, an arm pivoted at one end to the free end of said extension, a spring tensioned to tend to move the free end of said arm toward the periphery of said support, a bolt passing through said slot and said aperture adapted to clamp said support and plate to one another, means including said bolt for also clamping a circular saw blade through whose eye said bolt has been passed to said support, and means on the free end of said arm for engaging a gullet of such saw under tension of said spring.

5. In saw sharpening apparatus, a mandrel arranged in a horizontal plane, a support for said mandrel having a grooved-top table thereover with a slot therein, a grinding wheel mounted on said mandrel projecting through said slot in a plane parallel to such groove, an element slidable along a path afforded by said groove, a miter vertically pivoted to said element whereby the angular relation of said miter with respect to the grinding wheel and such groove can be modified, and a support fixed to said miter for holding a circular saw to be sharpened in a position to engage its teeth with said grinding wheel by movement of said miter and element along the element groove and in a manner dependent on the adjusted angular position of said miter.

CARLETON A. PHILLIPS.
WILLIAM B. SANFORD.

References Cited in the file of this patent

UNITED STATES PATENTS

| Number | Name | Date |
|---|---|---|
| 264,021 | Agan | Sept. 5, 1882 |
| 264,022 | Agan | Sept. 5, 1882 |
| 812,574 | Linton | Feb. 13, 1905 |
| 1,853,245 | Wardwell | Apr. 12, 1932 |
| 1,909,832 | Jirka | May 16, 1933 |
| 2,130,076 | Dominiak | Sept. 13, 1938 |
| 2,130,965 | Porter | Sept. 20, 1938 |
| 2,293,231 | Weiland | Aug. 18, 1942 |
| 2,436,004 | Hall | Feb. 17, 1948 |
| 2,570,118 | Hamberger | Oct. 2, 1951 |